(12) United States Patent
Otis et al.

(10) Patent No.: US 9,047,512 B2
(45) Date of Patent: *Jun. 2, 2015

(54) CONTACT LENSES

(71) Applicant: Google Inc., Mountain View, CA (US)

(72) Inventors: Brian Otis, Saratoga, CA (US); Babak Parviz, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,212

(22) Filed: Jun. 13, 2014

(65) Prior Publication Data

US 2014/0355842 A1 Dec. 4, 2014

Related U.S. Application Data

(63) Continuation of application No. 13/472,411, filed on May 15, 2012, now Pat. No. 8,798,332.

(51) Int. Cl.
| | |
|---|---|
| *G06K 9/20* | (2006.01) |
| *G06K 9/62* | (2006.01) |
| *G06K 9/00* | (2006.01) |
| *G02C 7/04* | (2006.01) |
| *G02C 11/00* | (2006.01) |

(52) U.S. Cl.
CPC ........ *G06K 9/00617* (2013.01); *G06K 9/00597* (2013.01); *G02C 7/049* (2013.01); *G02C 11/10* (2013.01); *G06K 9/00604* (2013.01)

(58) Field of Classification Search
None
See application file for complete search history.

(56) References Cited

U.S. PATENT DOCUMENTS

| | | | |
|---|---|---|---|
| 3,958,560 A | | 5/1976 | March |
| 4,014,321 A | * | 3/1977 | March ........................... 600/319 |
| 4,055,378 A | | 10/1977 | Feneberg et al. |
| 4,122,942 A | | 10/1978 | Wolfson |

(Continued)

FOREIGN PATENT DOCUMENTS

| | | |
|---|---|---|
| EP | 0369942 | 5/1990 |
| EP | 686372 | 12/1995 |

(Continued)

OTHER PUBLICATIONS

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

(Continued)

*Primary Examiner* — Brian P Werner
(74) *Attorney, Agent, or Firm* — McDonnoll Bochnon Hubert & Borghoff LLP

(57) ABSTRACT

Apparatus, systems and methods for facilitating iris-scanning contact lenses and/or biometric identification employing iris scanning contact lenses are provided. In one implementation, the contact lens can include: a transparent substrate formed to cover at least a portion of an iris of an eye; and a circuit. The circuit can include: one or more light sensors disposed on or within the transparent substrate and that detects light filtered through the iris and incident on the one or more light sensors; readout circuitry, operably coupled to the one or more light sensors, that outputs information indicative of the light filtered through the iris and incident on the one or more light sensors; and a power component that supplies power to the readout circuitry. In various implementations, the contact lens can be employed in systems and/or methods associated with authentication and identification.

20 Claims, 8 Drawing Sheets

(56) References Cited

U.S. PATENT DOCUMENTS

| | | |
|---|---|---|
| 4,136,250 A | 1/1979 | Mueller et al. |
| 4,143,949 A | 3/1979 | Chen |
| 4,153,641 A | 5/1979 | Deichert et al. |
| 4,214,014 A | 7/1980 | Hofer et al. |
| 4,309,085 A | 1/1982 | Morrison |
| 4,312,575 A | 1/1982 | Peyman et al. |
| 4,401,371 A | 8/1983 | Neefe |
| 4,463,149 A | 7/1984 | Ellis |
| 4,555,372 A | 11/1985 | Kunzler et al. |
| 4,604,479 A | 8/1986 | Ellis |
| 4,632,844 A | 12/1986 | Yanagihara et al. |
| 4,686,267 A | 8/1987 | Ellis et al. |
| 4,740,533 A | 4/1988 | Su et al. |
| 4,826,936 A | 5/1989 | Ellis |
| 4,996,275 A | 2/1991 | Ellis et al. |
| 4,997,770 A | 3/1991 | Giles et al. |
| 5,032,658 A | 7/1991 | Baron et al. |
| 5,034,461 A | 7/1991 | Lai et al. |
| 5,070,215 A | 12/1991 | Bambury et al. |
| 5,135,297 A | 8/1992 | Valint et al. |
| 5,177,165 A | 1/1993 | Valint et al. |
| 5,177,168 A | 1/1993 | Baron et al. |
| 5,219,965 A | 6/1993 | Valint et al. |
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicholson et al. |
| 5,908,906 A | 6/1999 | Kunzler et al. |
| 5,981,669 A | 11/1999 | Valint et al. |
| 6,087,941 A | 7/2000 | Ferraz |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe, III |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,785,406 B1 | 8/2004 | Kamada |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utusnomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,598 B2 | 7/2010 | Matey et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 8,608,310 B2 | 12/2013 | Otis et al. |
| 8,798,332 B2 | 8/2014 | Otis et al. |
| 2002/0193674 A1 | 12/2002 | Fleischman et al. |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0221276 A1 | 10/2005 | Rozakis et al. |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0142765 A1 | 6/2010 | Hamza |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0200235 A1 | 8/2011 | Tosa |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |

(56) References Cited

U.S. PATENT DOCUMENTS

| | | | |
|---|---|---|---|
| 2012/0041552 | A1 | 2/2012 | Chuck et al. |
| 2012/0069254 | A1 | 3/2012 | Burton |
| 2012/0075168 | A1 | 3/2012 | Osterhout et al. |
| 2012/0075574 | A1 | 3/2012 | Pugh et al. |
| 2012/0078071 | A1 | 3/2012 | Bohm et al. |
| 2012/0088258 | A1 | 4/2012 | Bishop et al. |
| 2012/0092612 | A1 | 4/2012 | Binder |
| 2012/0109296 | A1 | 5/2012 | Fan |
| 2012/0177576 | A1 | 7/2012 | Hu |
| 2012/0201755 | A1 | 8/2012 | Rozakis et al. |
| 2012/0245444 | A1 | 9/2012 | Otis et al. |
| 2012/0259188 | A1 | 10/2012 | Besling |
| 2013/0135578 | A1 | 5/2013 | Pugh et al. |
| 2013/0169683 | A1* | 7/2013 | Perez et al. .................... 345/633 |
| 2014/0193045 | A1 | 7/2014 | Otis et al. |

FOREIGN PATENT DOCUMENTS

| | | |
|---|---|---|
| EP | 1061874 | 12/2000 |
| EP | 1617757 | 1/2006 |
| EP | 1818008 | 8/2007 |
| EP | 1947501 | 7/2008 |
| EP | 2457122 | 5/2012 |
| JP | 2006-302276 | 11/2006 |
| WO | 95/04609 | 2/1995 |
| WO | 0116641 | 3/2001 |
| WO | 01/34312 | 5/2001 |
| WO | 03065876 | 8/2003 |
| WO | 2004/060431 | 7/2004 |
| WO | 2004064629 | 8/2004 |
| WO | 2006015315 | 2/2006 |
| WO | 2007/067927 | 6/2007 |
| WO | 2009094643 | 7/2009 |
| WO | 2010105728 | 9/2010 |
| WO | 2010/133317 | 11/2010 |
| WO | 2011/011344 | 1/2011 |
| WO | 2011034592 | 3/2011 |
| WO | 2011035228 | 3/2011 |
| WO | 2011035262 | 3/2011 |
| WO | 2011083105 | 7/2011 |
| WO | 2011163080 | 12/2011 |
| WO | 2012035429 | 3/2012 |
| WO | 2012037455 | 3/2012 |
| WO | 2012051167 | 4/2012 |
| WO | 2012051223 | 4/2012 |
| WO | 2012052765 | 4/2012 |

OTHER PUBLICATIONS

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.

Chu et al., "Biomedical soft contact-lens sensor for in situ ocular biomonitoring of tear contents," Biomed Microdevices, 2011, pp. 603-611, vol. 13.

Chu et al., "Soft contact lens biosensor for in situ monitoring of tear glucose as non-invasive blood sugar assessment," Talanta, 2011, pp. 960-965, vol. 83.

"Contact Lenses: Look Into My Eyes," The Economist, Jun. 2, 2011, http://www.economist.com/node/18750624/print, Last accessed Mar. 13, 2012, 8 pages.

Haders, "New Controlled Release Technologies Broaden Opportunities for Ophthalmic Therapies," Drug Delivery Technology, Jul./Aug. 2009, pp. 48-53, vol. 8, No. 7.

Ho et al., "Contact Lens With Integrated Inorganic Semiconductor Devices," MEMS 2008. IEEE 21st International Conference on. IEEE, 2008., pp. 403-406.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Murdan, "Electro-responsive drug delivery from hydrogels," Journal of Controlled Release, 2003, pp. 1-17, vol. 92.

Parviz, Babak A., "For Your Eyes Only," IEEE Spectrum, Sep. 2009, pp. 36-41.

Saeedi, E. et al "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

SENSIMED Triggerfish, Sensimed Brochure, 2010, 10 pages.

Shih, Yi-Chun et al., "An Inductorless DC-DC Converter for Energy Harvesting With a 1.2-μW Bandgap-Referenced Output Controller," IEEE Transactions on Circuits and Systems-II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Singh, et al., "Novel Approaches in Formulation and Drug Delivery using Contact Lenses," Journal of Basic and Clinical Pharmacy, May 2011, pp. 87-101, vol. 2, Issue 2.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 μA, Addressable Gent Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Wall, K., "Active contact lens that lets you see like the Terminator patented," Feb. 10, 2012, http://www.patexia.com/feed/active-contact-lens-that-lets-you-see-like-the-terminator-patented-2407, Last accessed Mar. 28, 2012, 5 pages.

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Bionic contact lens 'to project emails before eyes,' http://www.kurzweilai.net/forums/topic/bionic-contact-lens-to-project-emails-before-eyes, Last accessed Mar. 14, 2012, 2 pages.

Tweedie, et al., "Contact creep compliance of viscoelastic materials via nanoindentation," J. Mater. Res., Jun. 2006, vol. 21, No. 2, pp. 1576-1589, Materials Research Society.

Brahim, et al., "Polypyrrole-hydrogel composites for the construction of clinically important biosensors," 2002, Biosensors & Bioelectronics, vol. 17, pp. 53-59.

Huang, et al., "Wrinkling of Ultrathin Polymer Films," Mater. Res. Soc. Symp. Proc., 2006, vol. 924, 6 pages, Materials Research Society.

Zarbin, et al., "Nanotechnology in ophthalmology," Can J Ophthalmol, 2010, vol. 45, No. 5, pp. 457-476.

Selner, et al., "Novel Contact Lens Electrode Array for Multi-electrode Electroretinography (meERG)," IEEE, 2011, 2 pages.

Liao, et al., "A 3-μW CMOS Glucose Sensor for Wireless Contact-Lens Tear Glucose Monitoring," IEEE Journal of Solid-State Circuits, Jan. 2012, vol. 47, No. 1, pp. 335-344.

(56) References Cited

OTHER PUBLICATIONS

Chen, et al. "Microfabricated Implantable Parylene-Based Wireless Passive Intraocular Pressure Sensors," Journal of Microelectromechanical Systems, Dec. 2008, vol. 17, No. 6, pp. 1342-1351.
Thomas, et al., "Functional Contact Lenses for Remote Health Monitoring in Developing Countries," IEEE Global Humanitarian Technology Conference, 2011, pp. 212-217, IEEE Computer Society.
Pandey, et al., "A Fully Integrated RF-Powered Contact Lens With a Single Element Display," IEEE Transactions on Biomedical Circuits and Systems, Dec. 2010, vol. 4, No. 6, pages.
Lingley, et al., "Multipurpose integrated active contact lenses," SPIE, 2009, 2 pages.
Chu, et al., "Soft Contact-lens Sensor for Monitoring Tear Sugar as Novel Wearable Device of Body Sensor Network," http://www.ksi.edu/seke/dms11/DMS/2_Kohji_Mitsubayashi.pdf, Last accessed Jul. 27, 2012, 4 pages.
Liao, et al., "A 3μW Wirelessly Powered CMOS Glucose Sensor for an Active Contact Lens," 2011 IEEE International Solid-State Circuits Conference, Session 2, Feb. 21, 2011, 3 pages.
Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.
Lončar, et al., "Design and Fabrication of Silicon Photonic Crystal Optical Waveguides," Journal of Lightwave Technology, Oct. 2000, vol. 18, No. 10, pp. 1402-1411.
Liu, et al., "Miniature Amperometric Self-Powered Continuous Glucose Sensor with Linear Response," Analytical Chemistry, 7 pages, received Jan. 20, 2012, accepted Feb. 27, 2012.
Baxter, "Capacitive Sensors," 2000, 17 pages.
Lingley, et al., "A Single-Pixel Wireless Contact Lens Display," Journal of Micromechanics and Microengineering, 2011, 9 pages.
International Searching Authority, International Search Report and Written Opinion for International Application No. PCT/US2014/023320 mailed Dec. 10, 2014, 11 pages.

* cited by examiner

CONTACT LENSES

CROSS REFERENCE TO RELATED APPLICATIONS

The present application is a continuation of U.S. patent application Ser. No. 13/472,411, filed May 15, 2012, which application is incorporated herein by reference.

TECHNICAL FIELD

This disclosure generally relates to iris-scanning contact lenses and biometric identification employing iris scanning contact lenses.

BACKGROUND

As the interface between humans and technology has grown both in adoption rates and importance in our lives, security has become increasingly important. Verification of users can facilitate security. Biometrics is a class of user verification with the focus of identification of humans using characteristics unique to a particular human. Unfortunately, conventional biometric systems and techniques are relatively inconvenient to use. The inconvenience is exacerbated as the number of secure devices continues to grow. As such, new approaches for user verification are desired.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

In one or more implementations, the disclosed subject matter relates to a contact lens that facilitates iris scanning. The contact lens can include: a transparent substrate formed to cover at least a portion of an iris of an eye; and a circuit. The circuit can include: one or more light sensors disposed on or within the transparent substrate and that detects light filtered through the iris and incident on the one or more light sensors; readout circuitry, operably coupled to the one or more light sensors, that outputs information indicative of the light filtered through the iris and incident on the one or more light sensors; and a power component, operably coupled to the readout circuitry, that supplies power to the readout circuitry.

In one or more implementations, the disclosed subject matter relates to a method facilitating biometric iris recognition. The method can include: detecting, at one or more light sensors disposed on or within a transparent lens covering at least a portion of an eye, light reflected from light incident on an iris of the eye, wherein the light reflected includes image data indicative of a pattern associated with the iris; and outputting an iris fingerprint based in part on the image data.

In one or more implementations, the disclosed subject matter relates to a method of biometric identification. The method can include employing logic circuitry to execute computer executable components stored within a memory to perform: comparing a first iris fingerprint with a second iris fingerprint, wherein at least one of the first iris fingerprint or the second iris fingerprint is generated based, at least, on an iris pattern retrieved via readout circuitry communicatively one or more light sensors disposed on or within a contact lens and configured to detect light filtered by an iris on which the contact lens is substantially positioned; and determining whether a biometric match exists between the first iris fingerprint and the second iris fingerprint based, at least, on the comparing.

In one or more implementations, the disclosed subject matter relates to a system facilitating biometric identification. The system can include a memory that stores computer executable components; and logic circuitry that executes the following computer executable components stored in the memory. The computer executable components can include: a comparison component that compares a first iris fingerprint with a second iris fingerprint, wherein the first iris fingerprint is based, at least, on an iris pattern retrieved from circuitry coupled to one or more light sensors disposed on or within a contact lens, wherein the one or more light sensors detects light filtered by an iris on which the contact lens is substantially positioned; and a biometric match component that determines whether a biometric match exists based, at least, on a comparison by the comparison component.

Toward the accomplishment of the foregoing and related ends, the one or more implementations include the features hereinafter fully described and particularly poinTed out in the claims. The following description and the annexed drawings set forth herein detail certain illustrative aspects of the one or more implementations. These aspects are indicative, however, of but a few of the various ways in which the principles of various implementations can be employed, and the described implementations are intended to include all such aspects and their equivalents.

DETAILED DESCRIPTION

Figure 1:
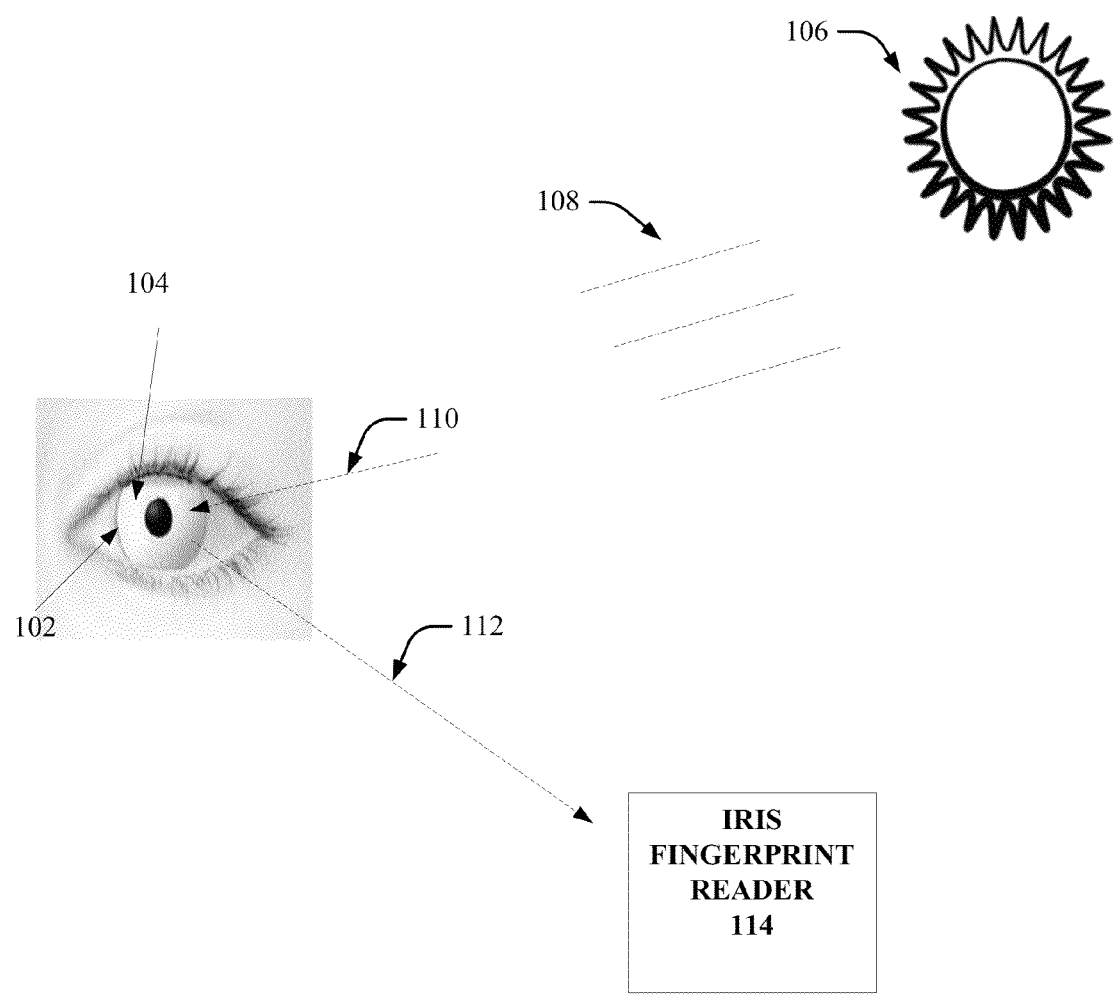
FIG. 1 is an illustration of a block diagram of an exemplary non-limiting system that facilitates iris scanning and/or biometric identification in accordance with implementations described herein.

Various implementations are now described with reference to the drawings, wherein like reference numerals are used to refer to like elements throughout. In the following description, for purposes of explanation, numerous specific details are set forth in order to provide a more thorough understanding of one or more implementations. It is be evident, however, that such implementations can be practiced without these specific details. In other instances, structures and devices are shown in block diagram form in order to facilitate describing one or more implementations.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Apparatus, systems and/or methods disclosed herein relate to contact lenses that facilitate iris scanning and/or to biometric iris identification. In particular, a contact lens can include: a transparent substrate formed to cover at least a portion of an iris of an eye; and a circuit. The circuit can include: one or more light sensors disposed on the transparent substrate, that detects light filtered through the iris and incident on the one or more light sensors; a power component, operably coupled to readout circuitry, that supplies power to the readout circuitry; and readout circuitry, operably coupled to the one or more light sensors, that outputs information indicative of the light filtered through the iris and incident on the one or more light sensors. In some implementations, a method of biometric iris identification can include: detecting, at one or more light sensors disposed on a transparent lens covering at least a portion of an eye, light reflected from light incident on an iris of the eye, wherein the light reflected includes image data indicative of a pattern associated with the iris; and outputting an iris fingerprint based in part on the image data.

One or more implementations of the apparatus, systems and/or methods described herein can advantageously facilitate user verification via contact lens biometric iris identification.

FIG. 1 is an illustration of a block diagram of an exemplary non-limiting system that facilitates iris scanning and/or biometric identification in accordance with implementations described herein. The system 100 includes a contact lens 102 covering at least a portion of an iris 104 and having a circuit, including one or more light sensors (not shown), a power component (not shown) and/or readout circuitry (not shown), disposed on the substrate of the contact lens that performs iris scanning and/or facilitates biometric identification. In some implementations, the system 100 can include the contact lens 102 covering at least a portion of the iris 104 and having the circuit, including one or more light sensors (not shown), a power component (not shown) and/or readout circuitry (not shown), disposed on the substrate of the contact lens that performs iris scanning and/or facilitates biometric identification and an iris fingerprint reader 114. In some implementations, the system 100 can include a light source 106 that emits light rays 108, the contact lens 102 covering at least a portion of the iris 104 and having the circuit, including one or more light sensors (not shown), a power component (not shown) and/or readout circuitry (not shown), disposed on a substrate of the contact lens that performs iris scanning and/or facilitates iris biometric identification, and the iris fingerprint reader 114.

In various implementations, the light source 106 can be the sun, ambient light (e.g., light inside of a building) and/or a specific interrogation light spectra. For example, the interrogation light spectra can be one or more wavelengths to which the light sensors of the contact lens are responsive.

In various implementations, light 110 is received at the iris 104 and is reflected. The one or more light sensors detect the light reflected from, and thus filtered through, the iris. The light filtered through the iris can be information 112 indicative of an iris fingerprint for the wearer of the contact lens 102. In various implementations, the iris fingerprint can be read, processed and/or stored by the iris fingerprint reader 114. The iris fingerprint can also be employed to determine whether access to secure devices can be provided, and/or whether secure information can be downloaded to third-parties, for example.

Accordingly, in an exemplary implementation, the detection surface of the light sensors face towards the iris to receive the light reflected from the iris.

In some implementations, the contact lens can also include a light source on the substrate of the contact lens. The light source could be disposed to project light into the iris of the wearer of the contact lens. The projected light can then be reflected and filtered through the iris and detected by the light sensors. As such, in various implementations, a light source other than ambient light can be employed to project light into the iris of the wearer of the contact lens.

Figure 2A:
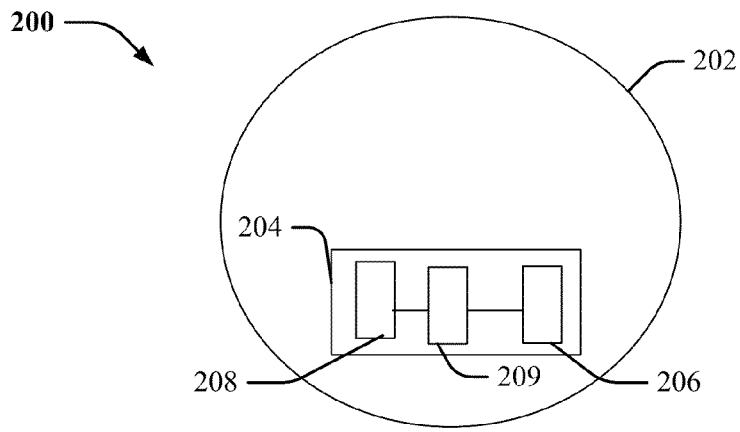
FIGS. 2A, 2B and 2C are illustrations of block diagrams of exemplary non-limiting contact lenses that facilitate iris scanning in accordance with implementations described herein.
Figure 2B:
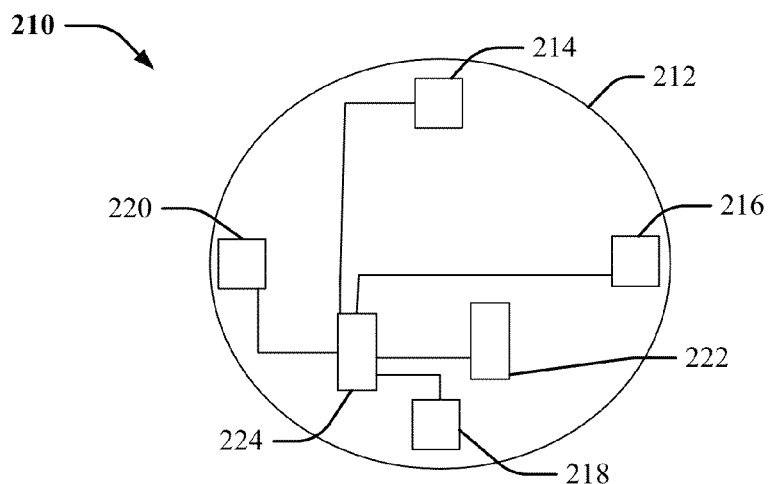
Figure 2C:
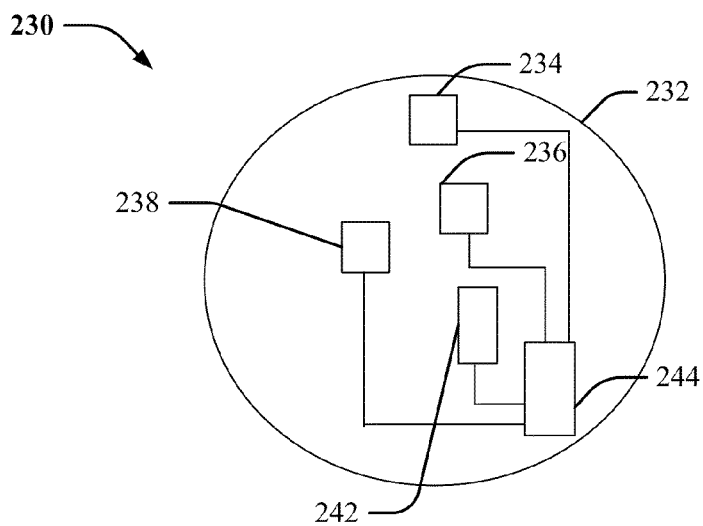
Figure 3:
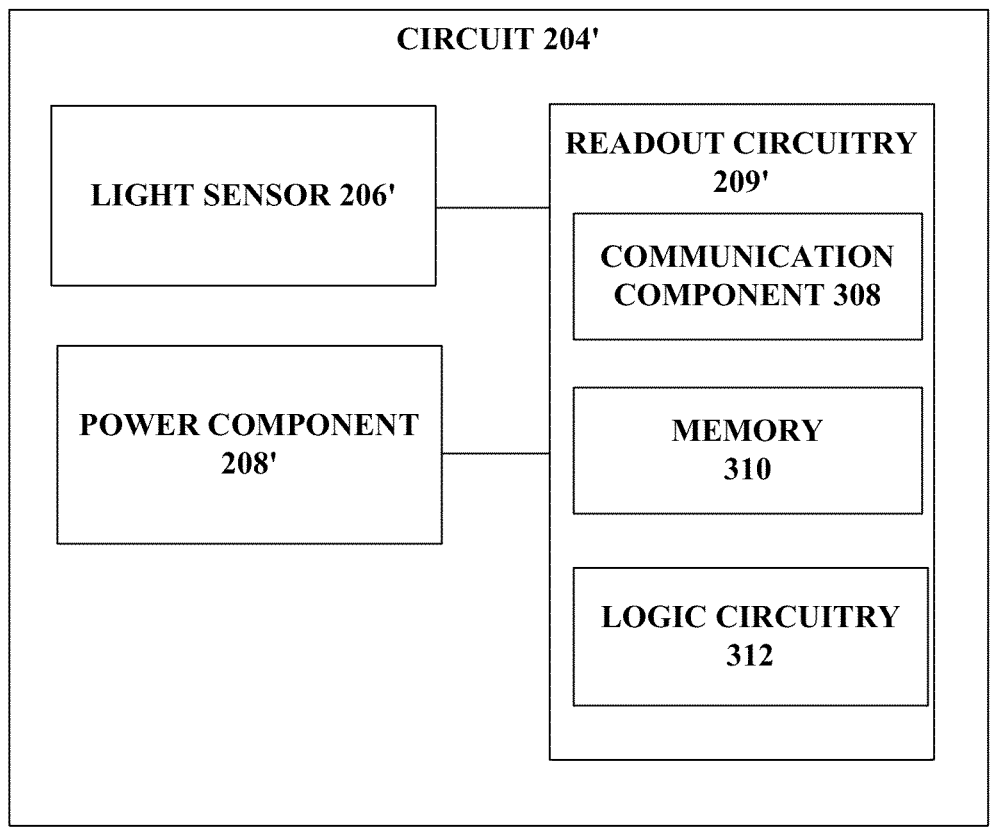
FIG. 3 is an illustration of a block diagram of an exemplary non-limiting circuit that facilitates iris scanning in accordance with implementations described herein.

Various implementations of the contact lens will be described with reference to FIGS. 2A, 2B, 2C and 3. FIGS. 2A, 2B and 2C are illustrations of block diagrams of exemplary non-limiting contact lenses that facilitate iris scanning in accordance with implementations described herein. FIG. 3 is an illustration of a block diagram of an exemplary non-limiting circuit that facilitates iris scanning in accordance with implementations described herein.

Turning first to FIG. 2A, the contact lens 200 can include a substrate 202 formed to cover at least a portion of an iris of an eye. In some implementations, the substrate can be transparent, e.g., a transparent polymer. The contact lens 200 can include a circuit 204 disposed on or within the substrate.

The circuit 204 can include at least one light sensor 206, a power component 208 and readout circuitry 209. In various implementations, light sensor 206, power component 208 and/or readout circuitry 209 can be operably, electrically and/or communicatively coupled to one another to perform one or more functions of the circuit. The circuit 204 can be configured to perform iris scanning, generation of an iris fingerprint and/or readout of information (e.g., an iris fingerprint) generated based, at least, on the iris scanning.

In some implementations, the circuit 204 can include a number of chips communicatively and/or electrically coupled to one another and having one or more different functions. For example, a first chip (e.g., the chip associated with power component 208) can be associated with power collection (e.g., harvesting power from incident light), a second chip (e.g., the chip associated with readout circuitry 209) can be associated with communication, and/or a third chip (e.g., the chip associated with light sensor 206) can be associated with detection of light filtered by the iris.

In some implementations, the light sensor 206 can have a detection surface facing the iris of the eye so as to detect light filtered through the iris of the wearer of the contact lens 200, and incident on the light sensor 206.

In some implementations, the light sensor 206 can be a light sensor including complementary metal-oxide-semiconductor (CMOS) components or technology and/or PN-junction components or technology. In some implementations, the light sensor 206 can be a passive structure that generates power upon receiving light (e.g., ambient light or an interrogation wavelength). In some implementations, the light sensor can include organic thin film components and/or technology, carbon nanotube devices and/or technology, thin cell batteries and/or high-density capacitors.

In some implementations, the light sensor 206 can be a transparent and/or translucent or semi-transparent/translucent light sensor. In various implementations, the light sensor 206 can be a light sensor adapted to detect specific light wavelengths. In some implementations, the light sensor 206 can be a monochromatic light sensor.

In some implementations, the light sensor 206 can be less than approximately 500 microns wide. In some implementations, the light sensor 206 can be any width capable of being integrated into a contact lens form factor.

In some implementations, the light sensor 206 can have a detection surface facing outward away from the iris as to perform one or more features including, but not limited to, power collection.

The power component 208 can supply power to the readout circuitry 209. In various implementations, the power component 208 can include one or more photovoltaic cells and/or one or more radio frequency (RF) antennas. In other implementations, the power component 208 can contain any of a number of different types of components for collection and/or generation of power.

While the implementation shown in FIG. 2A illustrates a wire connecting the power component 208 and the readout circuitry 209, in some implementations, the power component 208 can supply power to the readout circuitry 209 wirelessly. As such, the illustrated wire need not be included in the circuitry connecting the power component 208 to the readout circuitry 209.

In various implementations, the power component 208 can wirelessly receive power and/or information for supplying power to the readout circuitry 209. For example, the power component 208 can receive and/or process a signal and/or perform power collection according to any number of approaches, including, but not limited to, a near field communication, far field communication, evanescent frequency tunneling, the use of transformers and/or optical transmission.

The readout circuitry 209 can be communicatively and/or electrically coupled to the power component 208 and the light sensor 206. In some implementations, the readout circuitry 209 can determine the information sensed at the light sensor 206 and/or output such information. For example, in various implementations, the readout circuitry 209 can output information indicative of the light filtered through the iris and incident on the light sensor 206.

In various implementations, the information indicative of the light filtered through the iris can include a pattern associated with the iris. For example, with reference to FIG. 1, light 110 can enter the iris and be reflected from the iris as a unique pattern associated with the iris. The pattern (e.g., signature and/or fingerprint) formed by the filtering can be detected by the light sensor 206. The readout circuitry 209 can output an iris fingerprint, which can be the pattern or generated from the pattern.

The readout circuitry 209 can be low power in some implementations. In some implementations, the readout circuitry 209 can periodically determine the filtered light, fingerprint and/or information collected at the light sensor 206.

In some implementations, the readout circuitry 209 can output the information periodically. For example, the readout circuitry 209 can output the information in response to a polling signal received at the readout circuitry.

In some implementations, the readout circuitry 209 can receive a polling signal from a reader that is in proximity to the contact lens (such as iris fingerprint reader 114, described with reference to FIG. 1). For example, the reader can determine that the contact lens is within a particular proximity of the reader and generate a radio frequency (RF) polling signal. In response to receipt of the polling signal, the readout circuitry 209 can output the information obtained from the light sensor 206 and/or information generated by the readout circuitry 209.

In some implementations, the readout circuitry 209 can broadcast the information obtained from the light sensor 206 and/or information generated by the readout circuitry 209 intermittently. For example, in some implementations, the contact lens can awake at periodic intervals of time (e.g., every hour or once a day), or at a specific time, and the readout circuitry 209 can automatically output the information obtained from the light sensor 206 and/or information generated by the readout circuitry 209.

In some implementations, the readout circuitry 209 can output the information obtained from the light sensor 206 and/or information generated by the readout circuitry 209 continually.

In some implementations, the readout circuitry 209 can output the information obtained from the light sensor 206 and/or information generated by the readout circuitry 209 in response to a trigger and/or condition. For example, in various implementations, the readout circuitry 209 can output the information in response to detection that the reader is within a particular RF proximity and/or if a determination is made that a device utilizing the information stored at the readout circuitry 209 is within proximity (e.g., automobile configured to employ the information for locking or unlocking a door, a computer configured to employ the information for providing password access to the computer or the like) and/or if a determination is made that memory at the readout circuitry 209 is full or near full or the like.

In various implementations, the readout circuitry 209 can output the information from the contact lens 202 wirelessly. In various implementations, the information can be formatted and/or output according to a near field communication standard, far field communication standard, optical techniques or the like. In some implementations, the near field communication can be provided via a cellular telephone that can emit a signal to trigger scanning of the contact lens and/or that can emit a polling signal to poll the contact lens and thereby cause the readout circuitry 209 to output the information.

The information output from the readout circuitry 209 can be employed for biometric identification, authentication, as a password or the like. For example, the information can be employed to unlock one or more secure devices (e.g., automobiles, buildings, computers, telephones, safe deposit boxes). In some implementations, the information can be employed to facilitate uploading or downloading information from a cloud-based system. For example, if a biometric identification system (such as that described below with reference to FIG. 4) determines that the information is indicative of a person having access to the cloud-based system, the information can be employed to provide access to the cloud-based system. Additional information stored in the memory of the readout circuitry can be uploaded to the cloud. Similarly, additional information about the person can be downloaded from the cloud to the contact lens and/or to a third-party system if so desired by the person.

While FIG. 2A is described and shown as having a single light sensor 206, in various implementations, the circuit of FIG. 2A can include any number of light sensors. Further, in various implementations, the one or more light sensors, power component 208 and/or readout circuitry 209 can be arranged in any configuration (as shown in FIGS. 2B and 2C).

Turning now to FIG. 2B, a contact lens 210 having a circular array of one or more light sensors is shown. The contact lens 210 can include a substrate 212 formed to cover at least a portion of an iris of an eye. In some implementations, the substrate can be transparent, e.g., a transparent polymer. The contact lens 210 can include a plurality of light sensors 214, 216, 218, 220 arranged in an array on or within the substrate 212. For example, the light sensors 214, 216, 218, 220 can be arranged in a circular array. In other implementations, any number of other types of formations and/or arrays of light sensors 214, 216, 218, 220 can be designed over the substrate 212. While four light sensors are shown, any number of light sensors can be employed as determined by the apparatus and/or system designer. The light sensors 214, 216, 218, 220 can include one or more of the structure and/or functionality of light sensor 206 (and vice versa) described in this disclosure.

The readout circuitry 224 can be electrically and/or communicatively coupled to the light sensors 214, 216, 218, 220 and/or power component 222. As such, the readout circuitry 224 can read the information detected and/or generated by the light sensors 214, 216, 218, 220. The readout circuitry 224 can output the information generated by the light sensors 214, 216, 218, 220 and/or generated by the readout circuitry 224. The readout circuitry 224 can include one or more of the structure and/or functionality of readout circuitry 209 (and vice versa) described in this disclosure.

The power component 222 can provide power to the readout circuitry 224. The power can be provided wirelessly. In various implementations, the power component 222 can receive power via optical and/or RF approaches. The power component 222 can include one or more of the structure and/or functionality of power component 208 (and vice versa) described in this disclosure.

Turning now to FIG. 2C, a contact lens 230 having a group of randomly-placed light sensors is shown. The contact lens 230 can include a substrate 232 formed to cover at least a portion of an iris of an eye. In some implementations, the substrate can be transparent, e.g., a transparent polymer. The contact lens 230 can include a plurality of light sensors 234, 236, 238 arranged in a random or semi-random layout on or within the substrate 212. Certain regions of the substrate may be excluded from potentially including a light sensor, e.g., a region at the center of the substrate. In some implementations, any number of other types of formations and/or arrays of light sensors 234, 236, 238 can be designed over the substrate 232. While three light sensors are shown, any number of light sensors can be employed as determined by the apparatus and/or system designer. The light sensors 234, 236, 238 can include one or more of the structure and/or functionality of light sensor 206 (and vice versa) described in this disclosure.

The readout circuitry 244 can be electrically and/or communicatively coupled to the light sensors 234, 236, 238. As such, the readout circuitry 244 can read the information detected and/or generated by the light sensors 234, 236, 238. The readout circuitry 244 can output the information generated by the light sensors 234, 236, 238 and/or generated by the readout circuitry 244. The readout circuitry 244 can include one or more of the structure and/or functionality of readout circuitry 209 (and vice versa) described in this disclosure.

The power component 242 can provide power to the readout circuitry 244. The power can be provided wirelessly. In various implementations, the power component 242 can receive power via optical and/or RF approaches. The power component 242 can include one or more of the structure and/or functionality of power component 208 (and vice versa) described in this disclosure.

FIG. 3 is an illustration of a block diagram of an exemplary non-limiting circuit that facilitates iris scanning in accordance with implementations described herein. Circuit 204' can be disposed on or within a substrate of a contact lens in various implementations. For example, circuit 204' can be disposed on or within the contact lenses of FIGS. 2A, 2B and/or 2C in various implementations.

In some implementations, the structure and/or functionality of circuit 204 can be as described with reference to circuit 204' of FIG. 3. In some implementations, one or more of the structure and/or functionality of the light sensor 206', power component 208' and/or readout circuitry 209' can have the structure and/or functionality of any of the light sensors, power component and/or readout circuitry described with reference to FIGS. 2A, 2B and 2C. Similarly, the light sensors, power component and/or readout circuitry described with reference to FIGS. 2A, 2B and 2C can have the structure and/or functionality of light sensor 206', power component 208' and/or readout circuitry 209' respectively.

In some implementations, the power component 208' can be coupled to the readout circuitry 209' to provide power to the readout circuitry 209'. The light sensor 206' can be coupled to the readout circuitry 209' to enable communication between the light sensor 206' and the readout circuitry 209'. For example, the readout circuitry 209' can read or detect the light filtered by the iris that is sensed by the light sensor 206'. In some implementations, the readout circuitry 209' can detect and/or generate an iris fingerprint based on the light filtered by the iris and sensed by the light sensor 206'.

In some implementations, the readout circuitry 209' can include a communication component 308 configured to transmit and/or receive information collected and/or generated by the readout circuitry 209'. For example, the communication component 308 can be configured to transmit and/or receive the iris fingerprint and/or other information about the wearer of the contact lens. In some implementations, the other information about the wearer of the contact lens can include passport information, driver's license information, passwords, biographical information, medical information (e.g., for use by medical personnel during a medical emergency), pictures or the like, as may be authorized by the wearer. The information can be transmitted and/or received in response to biometric identification of the wearer of the contact lens. For example, information can be transmitted and/or received to or from a server-based or cloud-based system in response to the successful identification.

In some implementations, the communication component 308 can be configured to transmit the iris fingerprint to a reader of the contact lens located remote from the contact lens.

In some implementations, the communication component 308 can be configured to transmit the iris fingerprint to a secure device to unlock the device. The secure device can include, but is not limited to, an automobile or door lock, computer, telephone, safe deposit box or the like.

The readout circuitry 209' can also include memory 310 and a logic circuitry 312. The memory 310 can be a computer-readable storage medium storing computer-executable instructions and/or information for performing the functions described in this disclosure with reference to the circuit 204'. For example, memory 310 can store computer-executable instructions in some implementations, for performing the functions of iris fingerprint generation, reading out information indicative of light filtered by the iris and detected by the light sensor 206', receiving and/or responding to a polling signal or the like. In some implementations, the memory 310 can store information about the wearer of the contact lens including, but not limited to, biographical information, pictures, passport information, driver's license information, emergency medical information (e.g., allergies or particular medical conditions) or the like, as provided by the wearer. Logic circuitry 312 can perform one or more of the functions described in this disclosure with reference to readout circuitry 209 (or components thereof).

Figure 4:
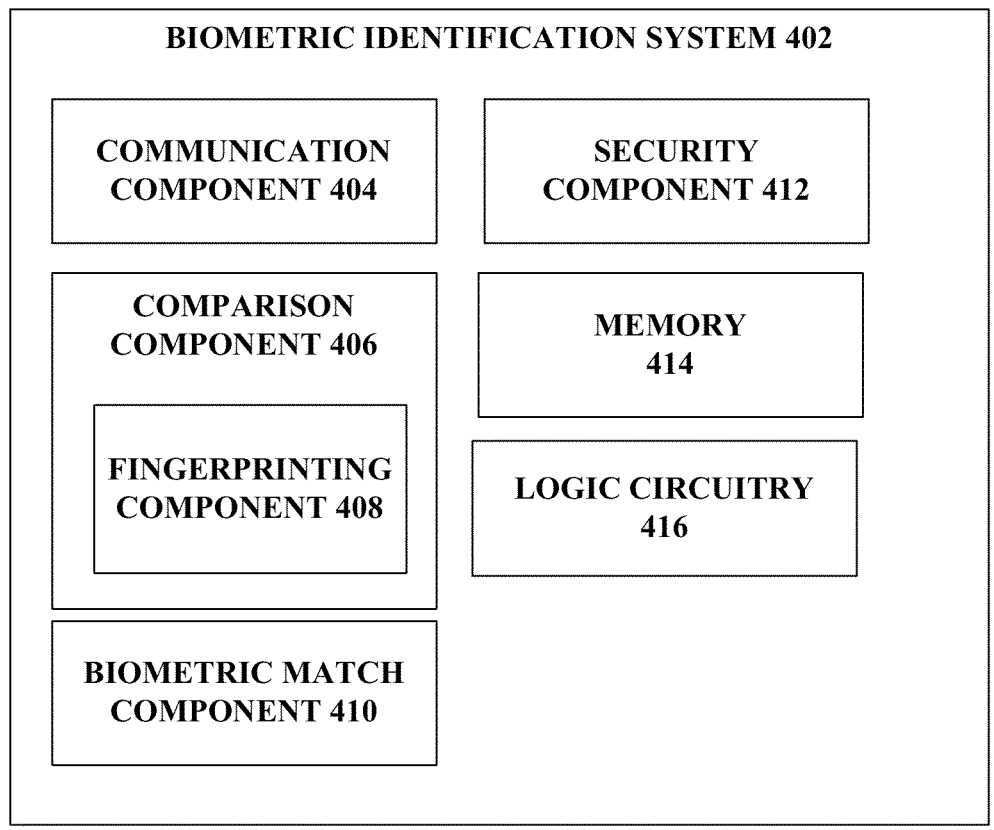
FIG. 4 is an illustration of a block diagram of an exemplary non-limiting system that facilitates biometric identification in accordance with implementations described herein.

FIG. 4 is an illustration of a block diagram of an exemplary non-limiting system that facilitates biometric identification in accordance with implementations described herein. The biometric identification system 402 can include a communication component 404, a comparison component 406, a fingerprinting component 408, a biometric match component 410, a security component 412, a memory 414 and/or a logic circuitry 416. In various implementations, one or more of the communication component 404, comparison component 406, fingerprinting component 408, biometric match component 410, security component 412, memory 414 and/or logic circuitry 416 can be electrically and/or communicatively coupled to one another.

The communication component 404 can be configured to transmit and/or receive information to or from the contact lens and/or a third-party system. For example, the communication component 404 can transmit information (e.g., the iris fingerprint and/or authorization to unlock a security device or system, a password being transmitted based on a determination by the biometric identification system 402 that the wearer of the contact lens has been authenticated, etc.).

In some implementations, the communication component 404 can upload and/or download information associated with a person wearing the contact lens.

The comparison component 406 can compare a first iris fingerprint with a second iris fingerprint. The first and/or second fingerprint can be stored locally at the biometric identification system 402 (e.g., in the memory 414 of the biometric identification system 402) or remotely at a location other than the biometric identification system (e.g., in the contact lens). In some implementations, the first iris fingerprint can be retrieved from the contact lens and the second iris fingerprint can be a previously-stored fingerprint. The comparison component 406 can include and/or be operably coupled to a fingerprinting component 408.

In some implementations, the fingerprinting component 408 can generate the first and/or second iris fingerprint. The first and/or second fingerprint can be generated based, at least, on an iris pattern retrieved from circuitry coupled to one or more light sensors disposed on or within the contact lens (e.g., the readout circuitry described with reference to FIGS. 2A, 2B, 2C and/or 3).

The biometric match component 410 can determine whether a biometric match exists between the first and second fingerprints. The determination can be based, at least, on the comparison by the comparison component 404.

The security component 412 can lock and/or unlock a device based on the determination by the biometric match component 410 as to whether a match exists. In some implementations, the security component 412 can unlock a device based on a determination that a biometric match exists.

In some implementations, the security component 412 can provide access to another system (not shown) based, at least, on a determination that a biometric match exists. In various implementations, the system to which access is provided can be a cloud-based system, an automobile or other transportation system, a door security system, a computer security system and/or a mobile phone security system.

The memory 414 can be a computer-readable storage medium storing computer-executable instructions and/or information for performing the functions described in this disclosure with reference to the biometric identification system 402. The logic circuitry 416 can perform one or more of the functions described in this disclosure with reference to the biometric identification system 402 (or components thereof).

Figure 5:
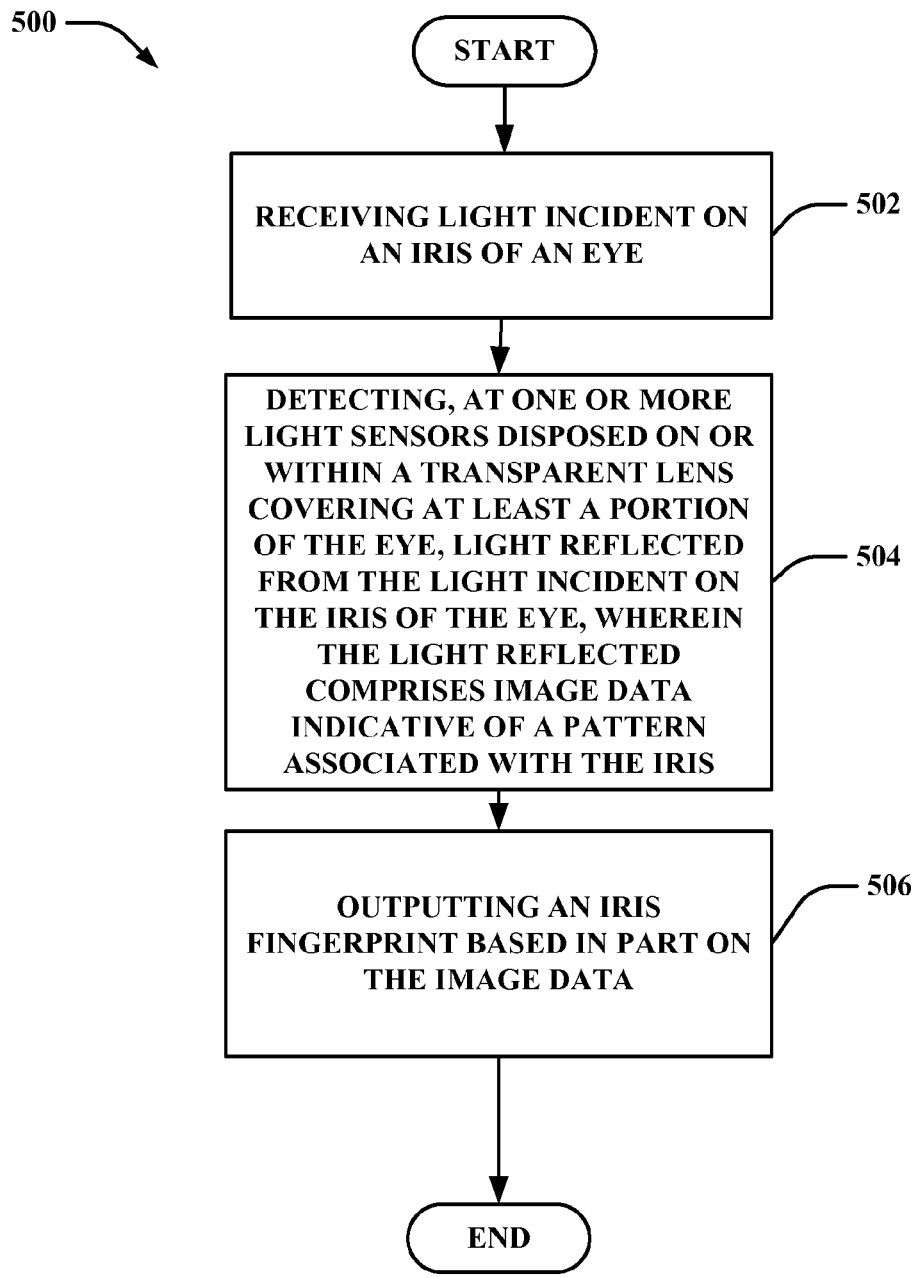
FIG. 5 is an illustration of an exemplary flow diagram of a method that facilitates iris scanning in accordance with implementations described herein.

FIG. 5 is an illustration of an exemplary flow diagram of a method that facilitates iris scanning in accordance with implementations described herein. At 502, method 500 can include receiving light incident on an iris of an eye (e.g., using the light sensor 206'). In various implementations, the light incident on the iris can be ambient light and/or a selected interrogation light wavelength.

At 504, method 500 can include detecting, at one or more light sensors disposed on or within a transparent lens covering at least a portion of the eye, light reflected from light incident on the iris of the eye (e.g., using the light sensor 206'). The light reflected can include image data indicative of a pattern associated with the iris.

In some implementations, the one or more light sensors can be a complementary metal oxide semiconductor (CMOS) light sensor or a monochromatic light sensor. For example, in some implementations, the one or more light sensors can be configured to detect light of one or more selected wavelengths.

At 506, method 500 can include outputting an iris fingerprint based in part on the image data (e.g., using the communication component 308 of the readout circuitry 209'). In some implementations, outputting the image data can be performed wirelessly. In some implementations, outputting the image data is performed according to a near field communication standard. For example, a near field communication can be provided via a mobile telephone that can emit a signal to scan the contact lens and/or that can emit a polling signal to poll the contact lens and thereby cause the outputting of the iris fingerprint.

Although not shown, method 500 can also include receiving a polling signal (at the communication component 308 of the readout circuitry 209'). In these implementations, outputting the image data can be performed periodically in response to receiving the polling signal.

Although not shown, method 500 can also include receiving power at the one or more light sensors (e.g., using the light sensor 206'). The power can be received wirelessly in some implementations.

Figure 6:
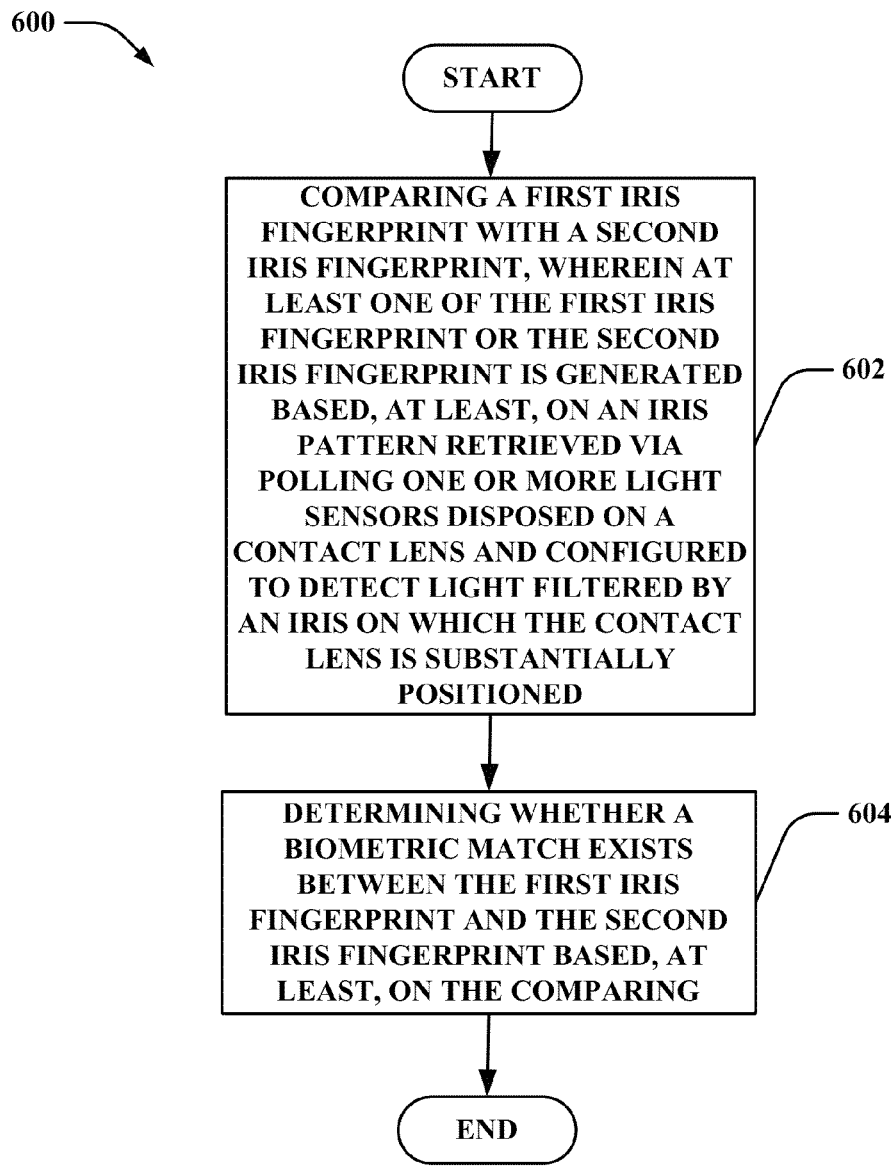
FIG. 6 is an illustration of an exemplary flow diagram of a method that facilitates biometric identification in accordance with implementations described herein.

FIG. 6 is an illustration of an exemplary flow diagram of a method that facilitates biometric identification in accordance with implementations described herein.

At 602, method 600 can include comparing a first iris fingerprint with a second iris fingerprint (e.g., using the comparison component 406). In various implementations, the first iris fingerprint or the second iris fingerprint can be generated based, at least, on an iris pattern retrieved via polling one or more light sensors disposed on or within a contact lens. The polling can be performed periodically in some implementations. In some implementations, the polling can be performed over a wireless communication channel according to a near field communication standard.

The first and/or second fingerprints can be generated by the fingerprinting component 406 in some implementations. In some embodiments, the first and/or second fingerprint can be received for comparison with the other fingerprint, which may be stored in a memory or database, for example.

The one or more light sensors can be configured to detect light filtered by an iris on which the contact lens is substantially positioned. In some implementations, the one or more light sensors can be CMOS light sensors.

At 604, method 600 can include determining whether a biometric match exists between the first iris fingerprint and the second iris fingerprint based, at least, on the comparing (e.g., using the biometric match component 410).

One or more of the apparatus, systems and/or methods described herein can be employed in or in association with automotive, consumer electronics and/or security apparatus, systems and/or methods. In various implementations, one or more of the apparatus, systems and/or methods can be employed in systems governed by fingerprinting standards, iris recognition and/or identification standards or the like.

Exemplary Networked and Distributed Environments

One of ordinary skill in the art can appreciate that various aspects described in this disclosure can be implemented in connection with any computer or other client or server device, which can be deployed as part of a computer network or in a distributed computing environment, and can be connected to any kind of data store where user verification (e.g., fingerprints) may be found. In this regard, the various implementations described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various implementations of this disclosure.

Figure 7:
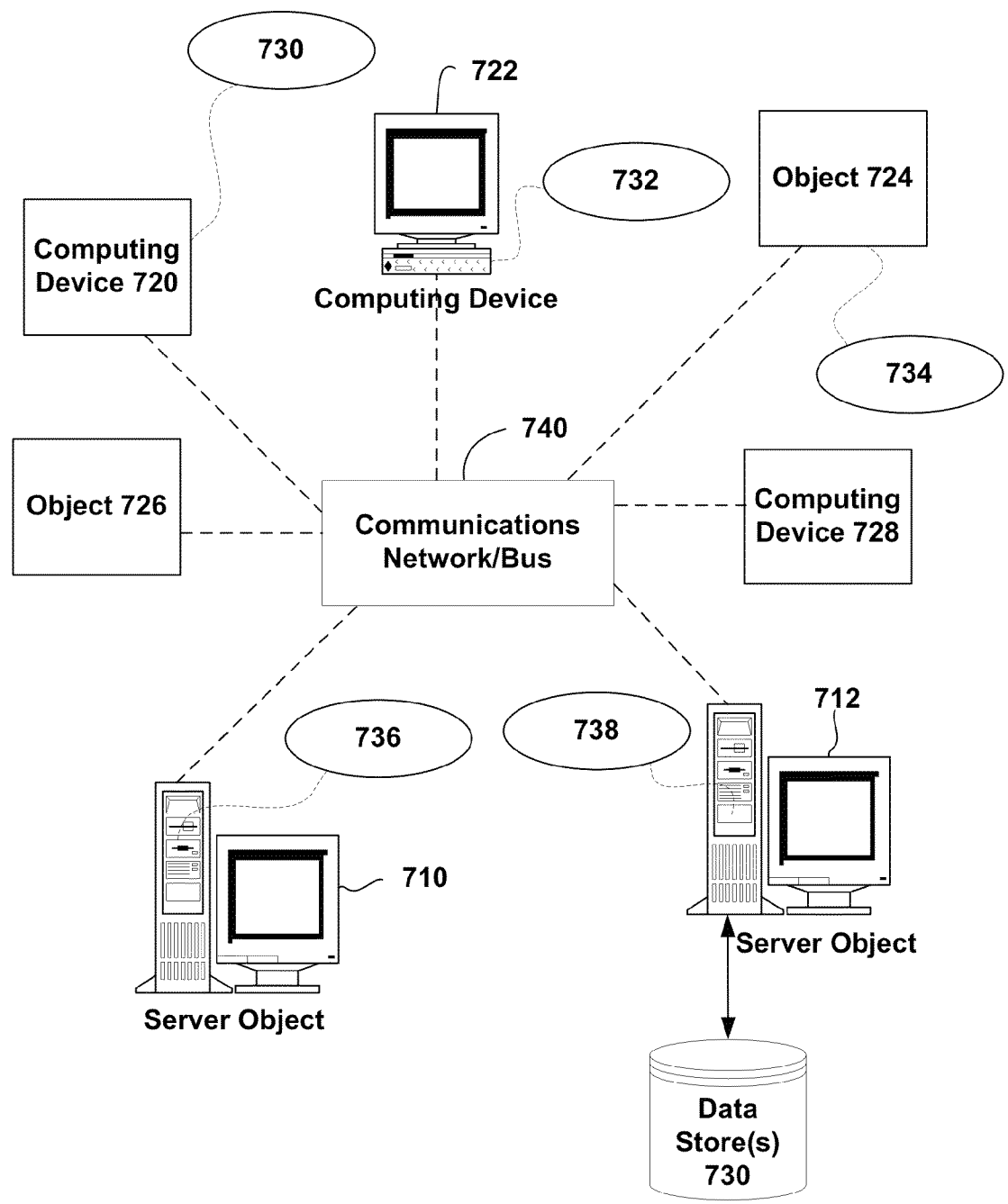
FIG. 7 is an illustration of a schematic diagram of an exemplary networked or distributed computing environment for implementing one or more implementations described herein.

FIG. 7 provides a schematic diagram of an exemplary networked or distributed computing environment in which aspects described in this disclosure can be implemented. The distributed computing environment includes computing objects 710, 712, etc. and computing objects or devices 720, 722, 724, 726, 728, etc., which can include programs, methods, data stores, programmable logic, etc., as represented by applications 730, 732, 734, 736, 738. It can be appreciated that computing objects 710, 712, etc. and computing objects or devices 720, 722, 724, 726, 728, etc. can include different devices, such as personal digital assistants (PDAs), audio/video devices, mobile phones, personal digital music players, personal computers, laptops, tablets, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, network 740 can include other computing objects and computing devices that provide services to the system of FIG. 7, and/or can represent multiple interconnected networks, which are not shown. Each computing object 710, 712, etc. or computing objects or devices 720, 722, 724, 726, 728, etc. can also contain an application, such as applications 730, 732, 734, 736, 738, that might make use of an application programming interface (API), or other object, software, firmware and/or hardware, suitable for communication with or implementation of the various implementations of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various implementations.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "component," "system," and the like are intended to refer to a computing-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc. provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances. Any of these computing devices can process data, or request transaction services or tasks that can implicate the techniques for systems as described in this disclosure for one or more implementations.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 740 can be the Internet, for example, the computing objects 710, 712, etc. can be Web servers, file servers, media servers, etc. with which the client computing objects or devices 720, 722, 724, 726, 728, etc. communicate via any of a number of known protocols, such as the hypertext transfer protocol (HTTP). Objects 710, 712, etc. can also serve as client computing objects or devices 720, 722, 724, 726, 728, etc., as can be characteristic of a distributed computing environment.

Exemplary Computing Device

Figure 8:
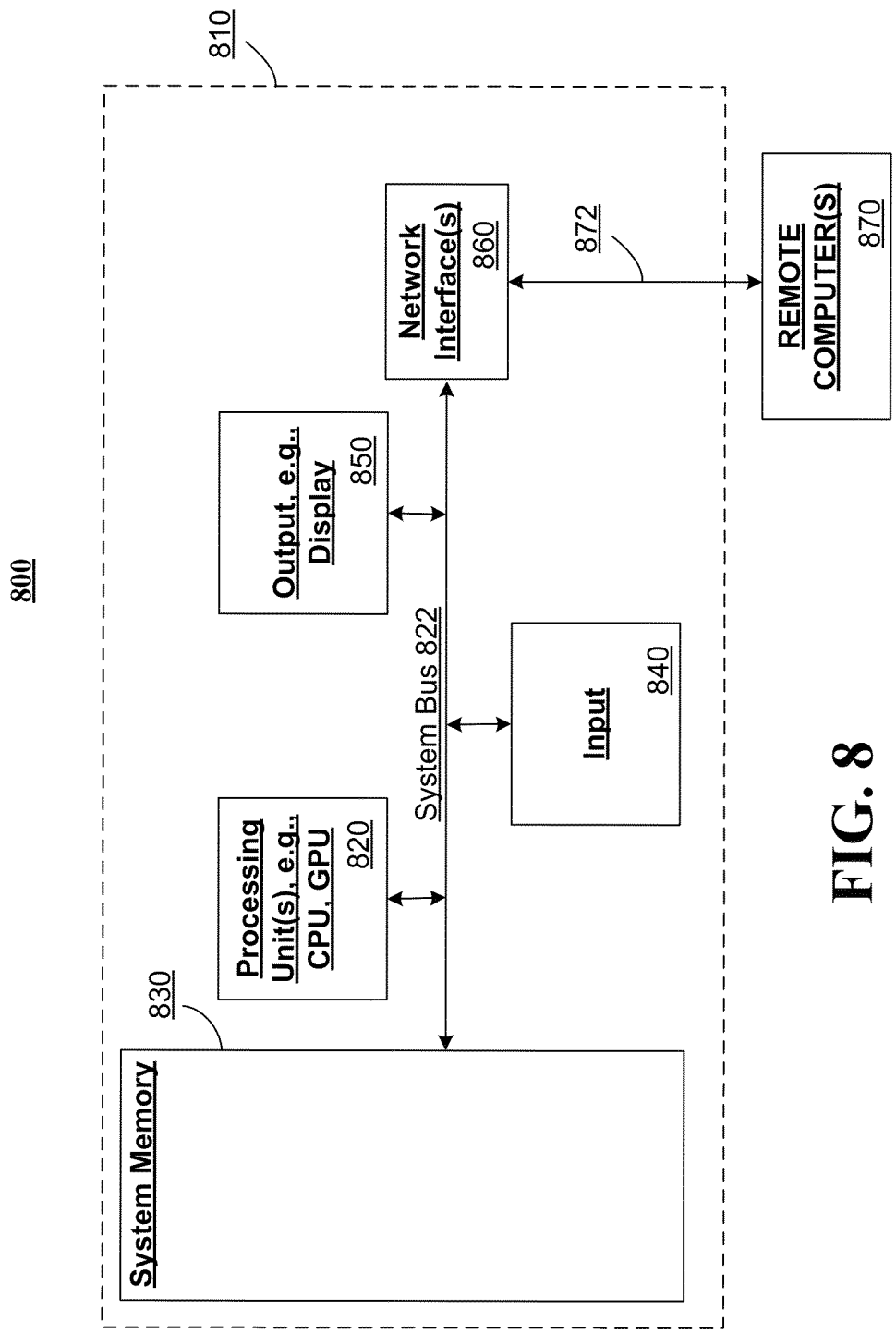
FIG. 8 is an illustration of a schematic diagram of an exemplary computing environment for implementing one or more implementations described herein.

As mentioned, advantageously, the techniques described in this disclosure can be applied to any suitable device. It is to be understood, therefore, that handheld, portable and other computing devices and computing objects of all kinds are contemplated for use in connection with the various implementations, e.g., anywhere that a device may wish to read or write transactions from or to a data store or wherein secure devices may need to be locked, unlocked and/or otherwise accessed, either from locations proximate to or remote from the device. Accordingly, the below remote computer described below in FIG. 8 is but one example of a computing device. Additionally, a suitable server can include one or more aspects of the below computer, such as a user fingerprint server, a biometric identification server or other server components.

Although not required, implementations can be partly implemented via an operating system, for use by a developer of services for a device or object, and/or included within application software that operates to perform one or more functional aspects of the various implementations described in this disclosure. Software can be described in the general context of computer executable instructions, such as program components, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 8 thus illustrates an example of a suitable computing system environment 800 in which one or aspects of the implementations described in this disclosure can be implemented, although as made clear above, the computing system environment 800 is only one example of a suitable computing environment and is not intended to suggest any limitation as to scope of use or functionality. Neither is the computing environment 800 to be interpreted as having any dependency or requirement relating to any one or combination of components illustrated in the exemplary computing environment 800.

With reference to FIG. 8, an exemplary computing environment 800 for implementing one or more implementations includes a computing device in the form of a computer 810 is provided. Components of computer 810 can include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 can include computer storage media in the form of volatile and/or nonvolatile memory such as read only memory (ROM) and/or random access memory (RAM). By way of example, and not limitation, memory 830 can also include an operating system, application programs, other program components, and program data.

A user can enter commands and information into the computer 810 through input devices 840, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 810. A monitor or other type of display device can be also connected to the system bus 822 via an interface, such as output interface 850. In addition to a monitor, computers can also include other peripheral output devices such as speakers and a printer, which can be connected through output interface 850.

The computer 810 can operate in a networked or distributed environment using logical connections to one or more other remote computers, such as remote computer 880. The remote computer 880 can be a personal computer, a server, a router, a network PC, a peer device or other common network node, or any other remote media consumption or transmission device, and can include any or all of the elements described above relative to the computer 810. The logical connections depicted in FIG. 8 include a network 882, such local area network (LAN) or a wide area network (WAN), but can also include other networks/buses e.g., cellular networks.

As mentioned above, while exemplary implementations have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, implementations herein are contemplated from the standpoint of an API (or other software object), as well as from a software or hardware object that implements one or more aspects described in this disclosure. Thus, various implementations described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and nonvolatile media, removable and non-removable media. By way of example, and not limitation, computer-readable storage media can be implemented in connection with any method or technology for storage of information such as computer-readable instructions, program components, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program components or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that aspects described in this disclosure can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, logic circuitry and/or other electronic units designed to perform the functions described in this disclosure, or a combination thereof.

When the aspects are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a component, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with components or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more implementations. It is, of course, not possible to describe every conceivable combination of components or methodologies for purposes of describing the aforementioned implementations, but one of ordinary skill in the art can recognize that many further combinations and permutations of various implementations are possible. Accordingly, the described implementations are intended to embrace all such alterations, modifications and variations that fall within the spirit and scope of the appended claims. Moreover, use of the term "an implementation" or "one implementation" throughout is not intended to mean the same implementation unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various implementations described in this disclosure, it is to be understood that other similar implementations can be used or modifications and additions can be made to the described implementation(s) for performing the same or equivalent function of the corresponding implementation(s) without deviating there from. Still further, multiple processing chips or multiple devices can share the performance of one or more functions described in this disclosure, and similarly, storage can be provided across a plurality of devices. The invention is not to be limited to any single implementation, but rather can be construed in breadth, spirit and scope in accordance with the appended claims.

What is claimed is:

1. A device, comprising:
   a contact lens comprising a transparent substrate formed to cover a structure of an eye; and
   a circuit comprising:
      one or more light sensors disposed on or within the transparent substrate and configured to detect light reflected from the structure of the eye and incident on the one or more light sensors; and
      readout circuitry, operably coupled to the one or more light sensors, configured to output information indicative of the light reflected from the structure of the eye and incident on the one or more light sensors.

2. The device of claim 1, further comprising:
   a power component, operably coupled to the readout circuitry, configured to supply power to the readout circuitry.

3. The device of claim 2, wherein the power component is configured to receive power wirelessly.

4. The device of claim 1, wherein the one or more light sensors comprise at least one of a complementary metal oxide semiconductor light sensor or a PN junction light sensor.

5. The device lens of claim 1, wherein at least one of the one or more light sensors is less than approximately 500 microns wide.

6. The device of claim 1, wherein the information indicative of the light reflected from the structure of the eye comprises a pattern associated with the structure of the eye.

7. The device of claim 6, wherein the readout circuitry is configured to output a fingerprint generated from the pattern, wherein the fingerprint facilitates biometric identification.

8. The device of claim 1, wherein the structure of the eye is an iris.

9. The device of claim 1, wherein the readout circuitry is configured to output the information in response to a wireless signal from another device.

10. A method, comprising:
    detecting, at one or more light sensors disposed on or within a transparent substrate of a contact lens covering a structure of an eye, light reflected from the structure of the eye, wherein the light reflected from the structure of the eye comprises image data indicative of a pattern associated with the structure of the eye; and
    outputting a fingerprint based in part on the image data.

11. The method of claim 10, further comprising receiving a wireless signal, wherein outputting the image data is performed in response to receiving the wireless signal.

12. The method of claim 10, wherein the outputting is performed wirelessly.

13. The method of claim 10, wherein the structure of the eye is an iris of an eye.

14. The method of claim 10, wherein the one or more light sensors comprise at least one of a complementary metal oxide semiconductor light sensor or a PN junction light sensor.

15. A method, comprising:
    receiving a first fingerprint from a device, wherein the device comprises a contact lens comprising a transparent substrate covering a structure of an eye, wherein the first fingerprint is generated by readout circuitry in the transparent substrate based on a pattern based on light reflected from the structure of the eye and incident on one or more light sensors in the transparent substrate;
    receiving a second fingerprint;
    comparing the first fingerprint with the second fingerprint; and
    determining whether a biometric match exists between the first fingerprint and the second fingerprint based, at least, on the comparing.

16. The method of claim 15, wherein the one or more light sensors are at least one of a complementary metal oxide semiconductor light sensor or a PN-junction light sensor.

17. The method of claim 15, wherein the first fingerprint is received wirelessly.

18. The method of claim 15, further comprising transmitting a wireless signal to the device, wherein the first fingerprint is received in response to the wireless signal being transmitted to the device.

19. The method of claim 15, further comprising:
    determining that the biometric match exists; and
    based, at least, on determining that the biometric match exists, unlocking another device.

20. The method of claim 15, further comprising:
    determining that the biometric match exists; and
    based, at least, on determining that the biometric match exists, providing access to another system.

* * * * *